United States Patent [19]

Deuchar

[11] 3,954,195

[45] May 4, 1976

[54] LEVER SYSTEMS PARTICULARLY USEFUL FOR FURNITURE

[76] Inventor: Francis Warwick Deuchar, 7 Beryl St., Croydon, Victoria, Australia

[22] Filed: Dec. 10, 1974

[21] Appl. No.: 531,493

[30] Foreign Application Priority Data

Dec. 11, 1973 Australia ............................ 5945/73

[52] U.S. Cl. .................................... 214/82; 74/469; 298/1 R; 297/316; 297/322

[51] Int. Cl.$^2$ ........................................... B60P 1/00

[58] Field of Search ............. 214/82, 510, 501, 505, 214/506; 298/1 R, 2, 5; 297/316, 317, 319, 320, 322; 74/469

[56] References Cited

UNITED STATES PATENTS

| | | | |
|---|---|---|---|
| 944,065 | 12/1909 | Wilmot | 297/320 |
| 1,075,636 | 10/1913 | Eyles | 297/320 X |
| 2,709,109 | 5/1955 | Reyburn | 298/2 X |
| 2,738,223 | 3/1956 | Metailler | 298/2 X |

FOREIGN PATENTS OR APPLICATIONS

| | | | |
|---|---|---|---|
| 608,542 | 2/1947 | United Kingdom | 297/316 |

*Primary Examiner*—Albert J. Makay
*Attorney, Agent, or Firm*—Fred Philpitt

[57] ABSTRACT

An article of furniture or mobile trolley is provided with a two lever system mounted on the frame of the article having a pivotal liftable member which is the seat cushion or trolley base. The liftable member is movable to an inclined position in response to selective actuation of the lever system to assist a person to move from the chair or to remove goods from the trolley.

2 Claims, 6 Drawing Figures

LEVER SYSTEMS PARTICULARLY USEFUL FOR FURNITURE

This invention relates to lever systems and particularly but not exclusively to an article of furniture such as a chair.

The object of the present invention is to provide a lever system in an article of furniture such as a chair or a mobile trolley or the like article having a base and a back and/or sides in which the base or seat is pivoted and mounted to be lifted by easy lever action so that the chain's occupant or trolley contents is/are raised for easy ejection or removal.

The present invention will be particularly described having reference to a lounge chair, however, upon obtaining an understanding of the invention it will be obvious to those skilled in the art that the principle of the invention may be utilised in various applications such as trolleys, shopping jeeps or some other situation where assisted manual lifting therefrom is possible and desirable.

The invention has particular application to the problem of elderly people or partially incapacitated people moving from a sitting position in a chair to a standing position.

Accordingly, it is a specific object of the invention to provide a chair in which a sitting person can more easily move to a standing position even where the chair is a relatively low built and softly cushioned lounge chair. It is with chairs of this type that elderly or disabled persons have most difficulty despite the fact that such chairs are generally most comfortable and most suitable for use by these people.

According to the present invention there is provided a lever system for an article of furniture, goods trolley or the like comprising a first lever member pivotally mounted on a frame of the article, a lift member pivotally mounted on said frame, a liftable member pivotally mounted on said frame engaged with said lift member for movement from a rest position to a raised position, and means selectively inter-engaging said first lever and said lift lever member to bring about said movement in response to selective movement of said first lever member relative to the frame.

Conveniently a lever system is provided for the purpose mentioned comprising in combination a lifting member mountable relative to a pivotable liftable member such as a seat base or trolley base, a lever member interconnected with said lifting member for movement relative to said lifting member to lift and/or lower the lifting member so that the seat base or trolley base or like is raised and/or lowered from or to its normal height.

Preferably the first lever member is an integral part of the chair back frame, base frame or a trolley wall frame or the like and is interconnected to the lifting member by a link pivotally mounted on either the first lever or a lifting member and includes a slot or notch for interconnecting the two members by engaging a pin on said first lever member or lifting member, whereby movement of the first lever member in one direction does not affect the lifting member, movement of the first lever member in the other direction is transferred to the lifting member. The interconnecting link may be provided with a keyhole slot providing lost motion in said one direction of movement of the first lever member but restraining the lifting member on movement in the other direction.

Further links or clips or brackets may be provided to restrain the lever member in a fixed position relative to the article to which the lever system is fitted. Means are also provided to selectively disconnect the first lever member and lifting member whereby the lifting member may move relative to the first lever member to a lowered stable position under the influence of gravity, and allow movement of the first lever member relative to the lifting member to a rest position.

The invention will be described in more detail with reference to a lounge chair having the lever system of the invention fitted thereto as illustrated in the accompanying drawings in which.

Figure 1:
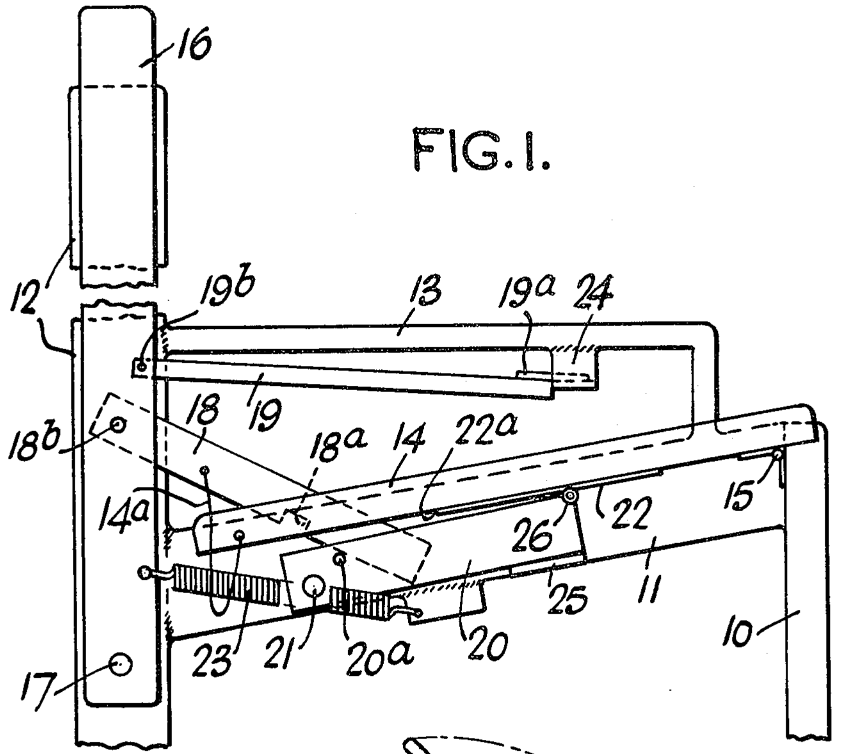
FIG. 1 is a side view of a chair in normal useable position.
Figure 3:
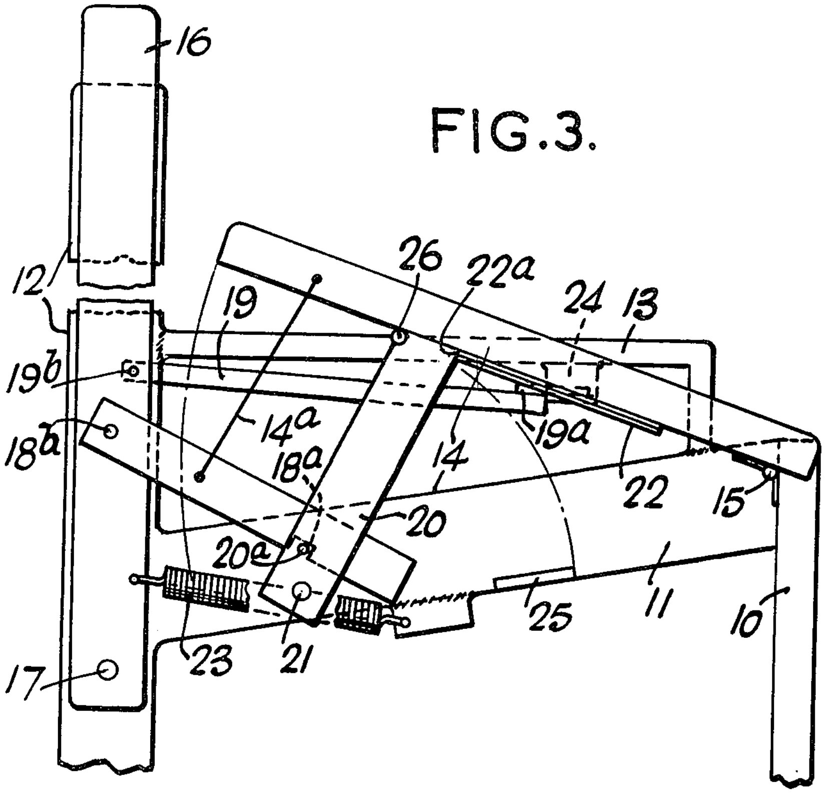
FIG. 3 is a side view of the chair showing the lifting stage.
Figure 4:
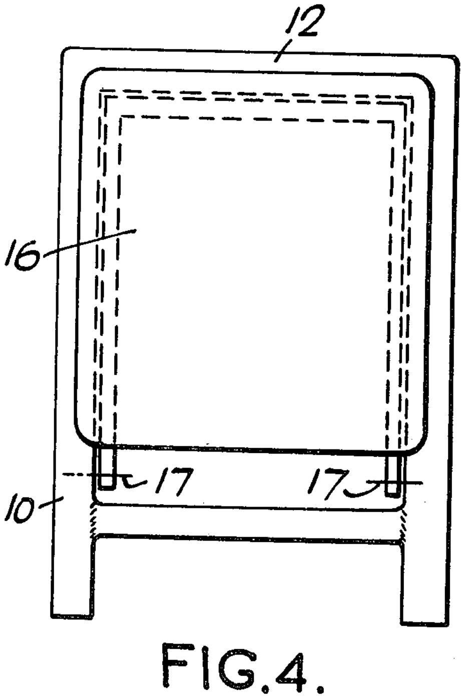
FIGS. 4 and 5 show back views of alternative chair configurations.
Figure 5:
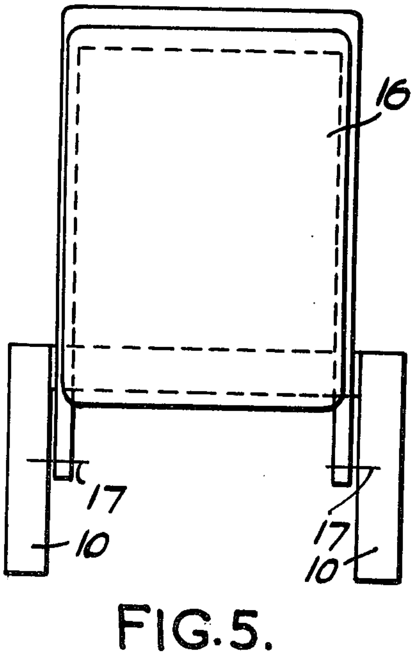

Referring to FIG. 1 which shows the chair in its normal use position, the chair comprises a static frame part and a dynamic lever system forming an integral part of the chair. Both parts will now be described in more detail. The frame part includes legs 10 and a base frame 11 and a back rest frame 12. The back rest and base may be connected by an arm rest 13. The base frame and legs pivotally support a liftable chair base panel 14. Pivots 15 are provided to allow movement upwardly from its normal lowered position as shown in FIG. 3 and will be later described in more detail.

The back rest of the chair includes what will in this specification be termed a first lever member 16 pivotally mounted on the chair frame at pivot point 17. The first lever member 16 is connected to two link members 18 and 19 pivotally mounted at pivots **18*b* and 19*b*. Link 18 is arranged to selectively interengage through slot or notch 18*a* and pin 20*a* with a lift member 20 pivotally mounted on pin 21, the lift member 20 in turn is engageable with the liftable panel 14. To assist in reduction of friction a small bearing 26 is provided to engage with panel 14. The panel includes a wear panel 22 which also acts as an abutment 22*a* as best shown in FIG. 3. Tension spring 23 is connected between the first lever member 16 and the base frame to bias the movable back rest forward when link member 19 is slotted into stop bracket 24. The link 19 has an extension 19*a* which remains engaged with bracket 24** to stop the link falling away from the arm rest and prevents forward pivoting of the first lever member when in normal use.

Figure 2:
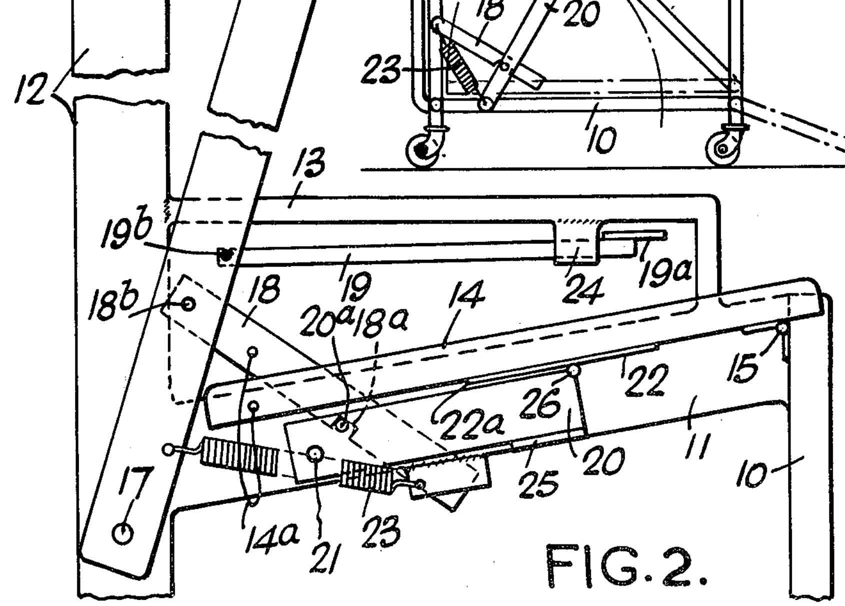
FIG. 2 is a side view of the chair showing a first stage of operation according to the invention.

In operation in relation to use of the invention to assist an occupant to move from a chair, the occupant first lifts link 19 to allign with stop bracket 24 whence the back rest lever member 16 will pivot forwardly under the action of the tension spring 23. Simultaneously the occupant of the chair is required to lean forward in the chair to allow movement of the back rest panel. Connecting member 18 slides forward until slot **18*a* engages with stop pin 20*a* on the lift member 20. Link 19 slides into bracket 24. The back rest lever member 16 is now in position shown in FIG. 2** which gives the chair occupant purchase in order to obtain leverage and apply force to the link system.

At this point the occupant simply leans back against the back rest lever member 16 whereupon the lift member 20 pivots about point 21. This movement in turn causes pivoting of seat member 14 about pivot point 15 to the position shown in FIG. 3 wherein the back rest lever member 16 is returned to its rest position. At this point the lift member has slid or rolled along surface 22 by virtue of bearing 26 and come to rest behind abutment 22*a*. Thus, the lift member 20 is effectively supporting the load of the base panel 14 and is prevented from moving back to its rest position by abutment 22*a*. The seat panel is inclined upwardly well out of a horizontal position thus making it very simple for the occupant to then move out of the chair to a standing position. It will be appreciated that the back rest lever member 16 at no time moves back further than its normal upright rest position. The chair is simply returned to its normal position by lifting the base panel 14 upwards slightly to disengage the link 18 from pin 20*a* by pulling cord 14*a*, and disengaging member 20 from abutment 22*a* whereby the lift member 20 is allowed to fall under gravity against rest surface 25. The base panel 14 is then able to fall to its normal position as shown in FIG. 1 ready for use and the link 19 falls slightly out of register with stop bracket 24 to prevent any forward pivoting of the back rest lever member 16. Link 19 may comprise a U-shaped member operable on both arms of the chair so that the link may be actuated by either hand of the occupant. Other forms of link connections between the two lever members are possible. For example, the connecting link 18 may include a key hole slot (not shown) engaging with a pin on lever member 20. In operation the back rest lever member can be pivoted forward as previously described the pin will slide in the slot until it engages the transverse portion of the key hole slot whence the lift member 20 is pivoted as previously described. Means are provided to disengage the pin from the transverse slot.

Figure 6:
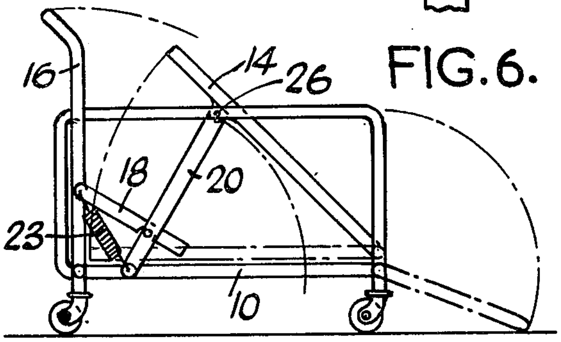
FIG. 6 shows the invention as applied to a trolley.

It will be appreciated that the invention may be simply applied to a box trolley where lifting of the floor in the manner as previously described in relation to a chair base is advantageous. FIG. 6 shows an example of such a construction incorporating a lever member 16 and lift member 20 and a connecting link 18, operating similarly to that previously described. The front of the trolley preferably has a hingeable panel for easy removal of contents. The floor of the trolley can be easily lifted a considerable distance to allow easy removal of the contents. The lift member 20 can be of any length suitable to achieve sufficient lifting of the liftable base member 14 when in use. The configuration of the lift member 20 may be varied to appear as a gear sector or pulley (not shown) engaging with the liftable member 14 in a rolling action.

In each practical arrangement described above it will be appreciated the first lever member 16 has a greater length and therefore a greater torque arm than the length of the lift member 20 thereby affording a good mechanical advantage in lifting the base of the article to which the invention is applied. This is achieved by making the distance between pivot pins 17 and 18*b* on the first lever member 16 much greater than the distance between pivot pins 21 and 20*a* on lift member 20. Thus upon interengagement with link 18, the pin 20*a* on lift member 20 is constrained to move through an identical displacement as pivot pin 18*b* on first lever member 16 upon rearward movement of lever member 16 to its rest position shown in FIG. 3 but with a lever arm mechanical advantage equivalent to the ratio of the dimensions between the pivot pins 17, 18*a* and 21, 20*a* mentioned above. Thus effortless displacement of the lift member 20 is achieved in a difficult situation whilst utilising a comparatively simple mechanism.

I claim:

1. A lever system in a goods trolley, shopping jeep or the like comprising a frame, a pivotal side wall member having a normal upright position and pivotally mounted on the trolley frame for forward movement, a liftable base member pivoted to the frame at its forward end, a lift member pivotally mounted on the frame and engageable with the liftable base member, link means pivotally mounted on the side wall member at one end and having the other end free, latch means including a notch intermediate the link means and a pin on the lift member, said latch means interconnecting the link means and said lift member upon relative pivotal movement of said side wall member, said side wall member acting as a lever member to move said lift member to engage and lift said base member about said forward pivot to assist in removal of goods from trolley upon movement of the side wall member to its normal upright position.

2. An invalid chair for assisting a seated person into a standing position comprising a frame, a pivotal back rest means having a normal upright back rest position pivotally mounted on the chair frame and movable to a forward position, a liftable seat member pivoted to the frame at its forward end, a lift member pivotally mounted on the frame and engageable with the liftable seat member, link means pivotally mounted on the back rest means, latch means interconnecting said lift member with the link means upon forward movement of the back rest means, said back rest means acting as a lever arm to move said lift member and thereby lifting said liftable member to an elevated position to assist a seated person to a standing position upon movement of the back rest means from its forward to its normal upright position.

* * * * *